United States Patent [19]

Rothbaum

[11] Patent Number: 5,670,776

[45] Date of Patent: Sep. 23, 1997

[54] ELECTROLUMINESCENT WALL PLATE AND SWITCH

[76] Inventor: Wayne P. Rothbaum, 10 Cedar Ridge Ave., Smithtown, N.Y. 11787

[21] Appl. No.: 369,644

[22] Filed: Jan. 6, 1995

[51] Int. Cl.⁶ .................................................. F21V 33/00
[52] U.S. Cl. ................................... 250/214 AL; 362/95
[58] Field of Search ........................ 250/214 AL, 214 R, 250/205, 221, 239; 362/84, 95, 226, 276; 200/310, 313, 314, 315, 317

[56] References Cited

U.S. PATENT DOCUMENTS

| 2,015,698 | 10/1935 | Tiffany . | |
|---|---|---|---|
| 2,988,661 | 6/1961 | Goodman | 313/108 |
| 3,161,797 | 12/1964 | Butler et al. | 313/108 |
| 3,307,030 | 2/1967 | DeFrancisco | 362/226 |
| 3,316,435 | 4/1967 | Kelso | 313/108 |
| 3,349,240 | 10/1967 | Brown . | |
| 3,588,489 | 6/1971 | Gaines | 362/95 |
| 4,000,405 | 12/1976 | Horwinski | 362/95 |
| 4,038,582 | 7/1977 | Horwinski | 362/95 |
| 4,075,449 | 2/1978 | Yagi et al. | 200/315 |
| 4,138,620 | 2/1979 | Dickson | 313/1 |
| 4,181,925 | 1/1980 | Burrows et al. | 362/29 |
| 4,319,164 | 3/1982 | Tulleners | 315/219 |
| 4,425,600 | 1/1984 | Barnhart | 362/84 |
| 4,449,075 | 5/1984 | D'Onofrio et al. | 315/169.3 |
| 4,527,096 | 7/1985 | Kindlmann | 315/169.3 |
| 4,588,921 | 5/1986 | Tischer | 313/496 |
| 4,613,793 | 9/1986 | Panicker et al. | 315/169.3 |
| 4,617,613 | 10/1986 | Rice | 362/95 |
| 4,658,129 | 4/1987 | Fan | 250/214 AL |
| 4,667,273 | 5/1987 | Queudray | 362/34 |
| 4,683,359 | 7/1987 | Wojtanek | 200/314 |
| 4,755,913 | 7/1988 | Sleveland | 362/95 |
| 4,774,641 | 9/1988 | Rice | 362/95 |
| 5,015,994 | 5/1991 | Hoberman et al. | 250/221 |
| 5,485,356 | 1/1996 | Nguyen | 362/95 |
| 5,544,025 | 8/1996 | Bohlool et al. | 362/95 |

OTHER PUBLICATIONS

Switch Limelite™, No. 4370000, p. 2, Alsto's Handy Helpers, Summer 1995.
Improvements™, Winter 1995, © 1995 Leichtung, Inc., p. 54, Lifetime Night Light, Item No. 109975.

*Primary Examiner*—Edward P. Westin
*Assistant Examiner*—John R. Lee
*Attorney, Agent, or Firm*—J. P. Blasko; Mark A. Garzia

[57] ABSTRACT

An improved wall plate incorporating an electroluminescent lamp for providing illumination to the immediate area proximate the wall plate. The electroluminescent (EL) panel is activated and deactivated by a photoconductive cell, in response to the intensity of ambient light falling on the wall plate. A further embodiment provides for an easily accessible regulating means for regulating the intensity of the light emitted by the EL panel.

22 Claims, 5 Drawing Sheets

ELECTROLUMINESCENT WALL PLATE AND SWITCH

FIELD OF THE INVENTION

This invention relates to electroluminescent (EL) lamps or panels and, more particularly, to a novel construction which provides for the illumination of a wall plate or light switch utilizing EL lamps.

BACKGROUND OF THE INVENTION

Electroluminescent (EL) lamps, panels and cells are known in the art, and various methods of construction and use have been disclosed. However, these inventions have mostly been limited to either technical improvements in the lamp itself, its driving circuits, or to specific backlighting applications for instrument panels, signs, clocks, and radios.

Illuminated switches are also known in the art. Present day light switches utilize AC powered neon lamps or light emitting diodes (LED) located proximate a light switch or inside a hollowed-out portion of the switch's throw. However, these illuminated switches have a number of limitations. Under normal conditions, the illuminated switch is difficult to locate because of the low intensity level of the light emitted by the LED or neon lamp. This is true even when the room is pitch-dark.

In addition, the LEDs or neon lamps are continuously energized until the light switch is activated. That is, previous illuminated switches are not designed with the capability to adjust the intensity of the emitted light, or deactivate it altogether, when there is a high level of ambient light in the room. This is economically inefficient especially in daylight when illumination is not required. Moreover, the continuous illumination may, at times, be undesirable, aesthetically unappealing or even annoying.

An alternative to the electrically-powered neon lamps and LED's is the use of phosphorescent materials to illuminate the throw of the light-switch or the light-switch plate. The phosphorescent material absorbs light energy and emits a luminescent glow. Although this is more economical from a manufacturing and operational point of view, there are a number of disadvantages in using phosphorescent materials. First, even if the phosphorescent material is subject to bright ambient light during daylight hours, the phosphors will remain illuminated for, at most, only a few hours after the bright light is removed. Second, if the ambient light levels are low because of poorly illuminated rooms or hallways, the phosphors may be inadequately illuminated during the day and, therefore, will not illuminate the switch plate during the night. Third, the luminance of these phosphors is extremely low. Finally, there is not a feasible means to variably adjust the luminescence of these phosphors.

SUMMARY OF THE INVENTION

The present invention is a wall plate including an electroluminescent (EL) panel or lamp, a means for introducing power to the electroluminescent panel and a structure to support the EL panel. The wall plate may be a switch plate, receptacle plate or the like, or combinations thereof. The power source of the electroluminescent panel may be a battery or a direct connection to the alternating current (AC) line which feeds the device (e.g., the switch, receptacle, etc.) which the wall plate covers.

The wall plate may include a variety of electrical circuits for activating, controlling and/or regulating the EL panel. For example, a light activated means, such as a photodiode or photoconductive cell, may be utilized in the circuit for controlling the energy to the electroluminescent panel with respect to ambient light levels (i.e., when the ambient light drops below a predetermined level, the EL panel is activated and emits light, when the ambient light is at or above the predetermined level, the EL lamp is deactivated). Further, a means to change the predetermined activation level, thereby changing the ambient light level at which the photoconductive cell is activated and deactivated can also be designed into the circuitry. In addition, the EL wall plate may include a means to adjust the brightness of the light emitted by the EL panel.

The present invention has multiple applications. From an operational standpoint, it is advantageous to cover the entire face of the wall plate with one or more EL panels, thereby providing the instant invention with the most versatility. The light emitted by the wall plate can be set at a soft glow wherein the wall plate is used as a beacon to locate a receptacle or switch. The intensity level of the emitted light can be increased to utilize the wall plate as a night light. At its maximum intensity level, a wall plate having an EL lamp covering its entire face can effectively serve as an area light.

In another embodiment, the electroluminescent panel may be mounted on the rocker or throw of the switch. Alternatively, the rocker can be made of a clear material having a hollow interior; the electroluminescent panel can then be mounted inside the hollow interior of the clear rocker.

Insulated wires would normally connect the EL panel circuitry to the AC power source. However, a clip means may be used to make this connection. This feature would enable the most novice handyman to quickly install the EL wall plate.

Objects and advantages of the subject invention will become apparent after a reading of the following description.

DETAILED DESCRIPTION OF THE PREFERRED EMBODIMENT

Referring to the drawings, a wall switch plate incorporating an electroluminescent (EL) lamp or panel is generally indicated at 10. The switch plate 10 includes two primary elements; namely an electroluminescent panel, and a means for introducing power to the EL panel (the power introducing means may include control circuitry). Although some EL panels may be rigid enough to withstand the normal wear and tear which a wall plate may receive, it is almost always preferable to include a separate support structure for the EL panel.

Figure 1:
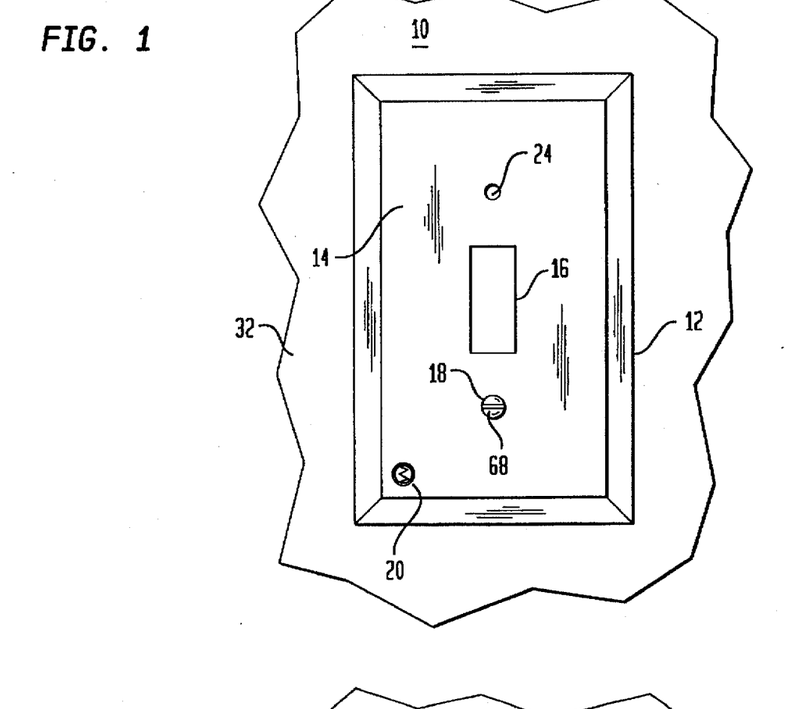
FIG. 1 is a front plan view of a wall switch plate incorporating an electroluminescent lamp, in accordance with the present invention.
Figure 2:
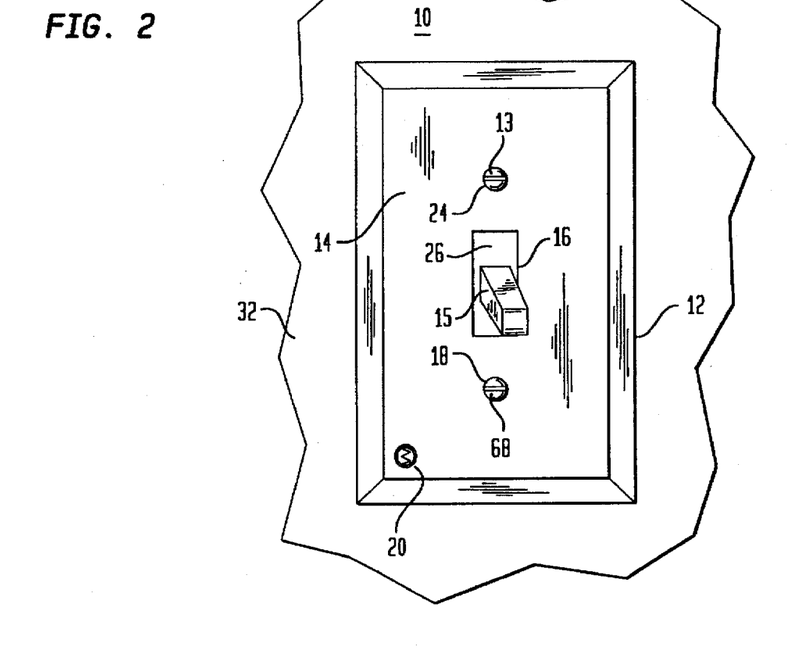
FIG. 2 is a perspective view of the wall switch plate of FIG. 1 mounted over a switch.
Figure 3A:
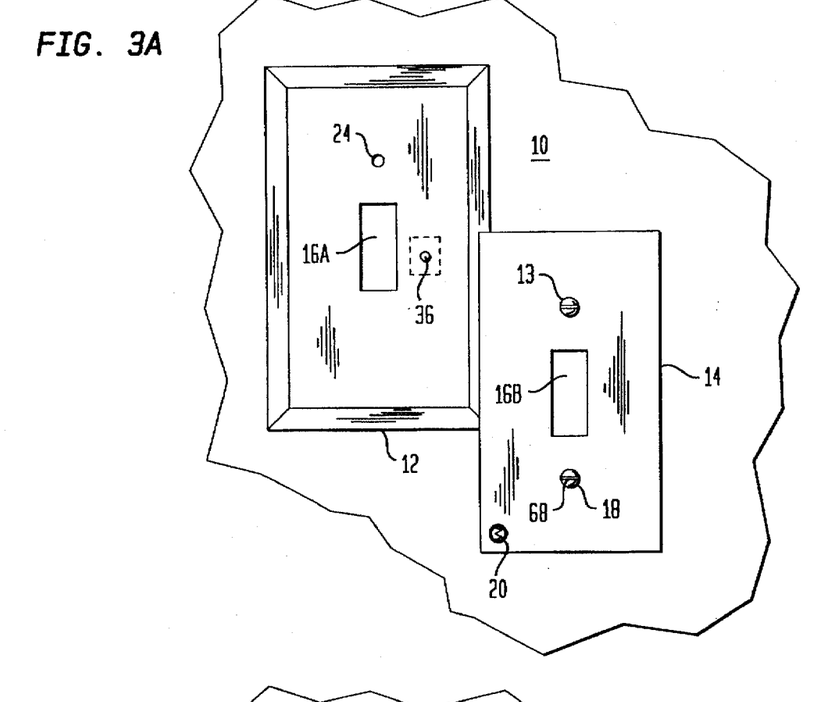
FIGS. 3A and 3B are exploded views of two embodiments of the wall switch plate.

In a first embodiment, the switch plate 10 includes a back plate 12 to provide structural support to the overall device and to cover a portion of the wall 32 proximate a switch 26 (See FIGS. 1, 2 and 3A). An electroluminescent panel 14 can be placed flat against the front surface of back plate 12 or within a specially designed channel or depression in the back plate 12. The EL panel 14 may be an off-the-shelf item or it may be customized for a particular installation.

A cutout 16 accommodates a throw 15 of the switch 26. As shown in FIG. 3A, cutout 16A is made through the back plate 12 and cutout 16B is made through the electroluminescent panel 14. Normally, the cutout 16 is substantially rectangularly shaped. Adhesive tape or glue may be used to affix the EL lamp 14 to the face of back plate 12.

Although the EL panel 14 is shown to be substantially rectangular in shape and covers the entire front surface of the back plate 12, the EL panel can be cut to substantially any geometric shape and need not cover the entire face of the backplate 12. The number of EL panels, their physical dimensions, their design or shape, and the color of the emitted light may be influenced by a number of factors, including the location of the switch plate, the amount of illumination desired, accommodation of desired motifs and aesthetic reasons.

Screw hole 24 allows a screw 13 to pass therethrough. Screw 13 is secured in pre-drilled hole 82 (See FIG. 7) of switch 26 which secures the electroluminescent lamp 14 against the back plate 12, and ultimately secures the entire wall plate 10 against the switch 26 and wall 32 as shown in FIG. 2.

Figure 3B:
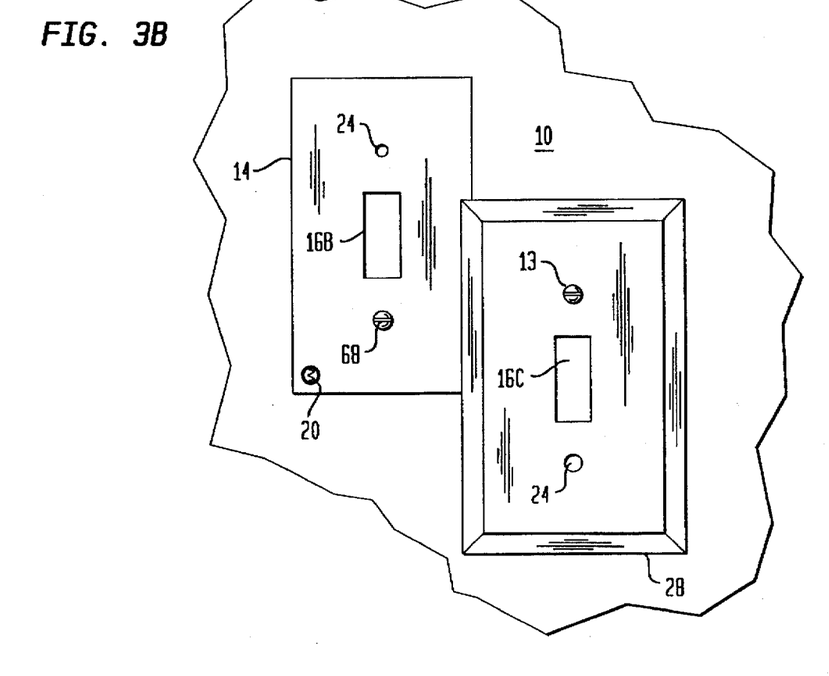

In another embodiment illustrated in FIG. 3B, a translucent face plate 28, conforming generally to the dimensions of a standard wall plate, can provide the necessary support while the EL panel 14 is located behind the face plate 28. (Like numbers are used to identify the common elements in the various embodiments of this invention.) The face plate 28 is preferably made of a clear plastic material which allows the light emitted from the electroluminescent panel 14 to shine through. Cutouts 16B and 16C of the EL panel 14 and face plate 28, respectively, accommodate the throw of the switch.

The electroluminescent panel 14 is placed on the rear or inner side of the face plate 28. An adhesive tape or glue may be applied at strategic points to secure the electroluminescent panel 14 against the back of face plate 28. However, the mounting screw 13 which passes through screw hole 24 in the face plate 28 and the EL panel 14 will adequately secure the wall plate 10 to the switch 26.

Figure 4:
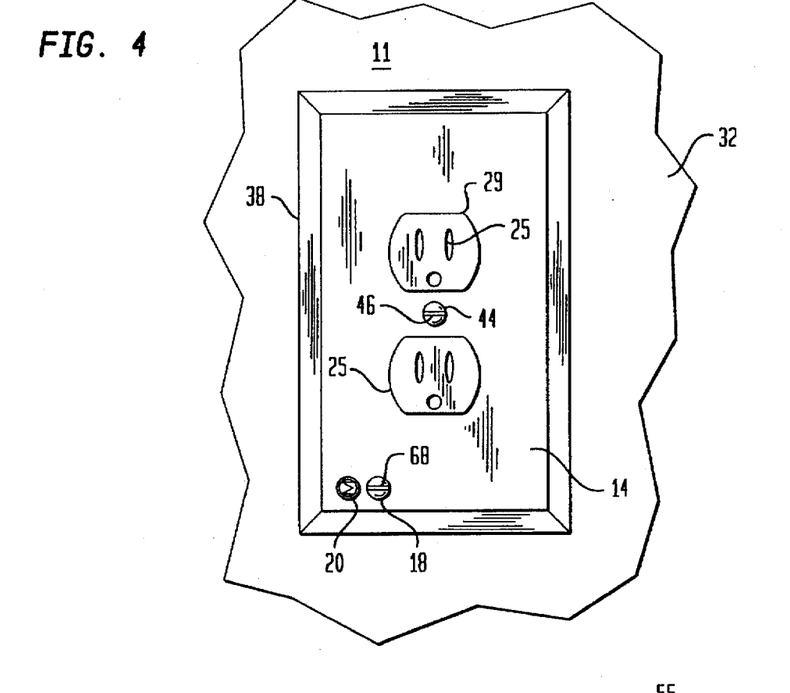
FIG. 4 is a front plan view of a wall receptacle plate incorporating an electroluminescent light mounted over a receptacle, in accordance with the present invention.

Virtually any size or style wall plate can accommodate an electroluminescent lamp since the actual shape of the electroluminescent lamp can be customized. For example, the present invention can be adapted for use in a multi-switch wall plate or, as seen in FIG. 4, in a receptacle wall plate 11.

A receptacle back plate 38 and an electroluminescent panel 14 are manufactured with appropriate apertures 25 to accommodate a receptacle 29. A screw aperture 44 accepts a securing screw 46; in this manner the receptacle plate 11 is secured to the receptacle 29 over a wall portion 32.

Figure 5:
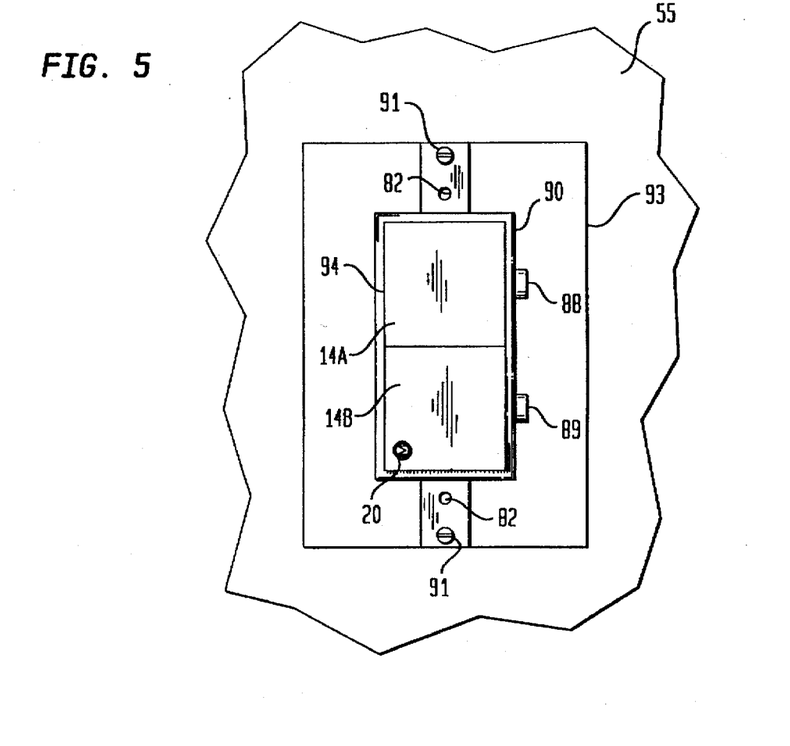
FIG. 5 is a front plan view of a wide-rocker switch incorporating the electroluminescent lamp of the present invention.

FIG. 5 exhibits an embodiment of the present invention for use with a wide-rocker switch 90. The wide-rocker switch 90 operates in the same manner as a standard electrical switch 26. However, the rocker or throw 94 of switch 90 has an extremely large surface area; this feature makes it ideal to accommodate one or more EL panels 14A, 14B. The EL panel 14 can be attached to the outer surface of the rocker 94. Alternatively, the rocker 94 can be manufactured from a translucent material, wherein the EL panel 14 can be attached to the back side of the rocker 94.

Securing screws 91 attach the wide-rocker switch 90 to an electrical box 93 in the usual manner. Apertures 82 allow a standard wall plate (not shown) to be screwed or snapped onto the wide rocker switch 90 thereby covering the box 93 and proximate wall portions 55.

It should be noted that an EL wall plate, similar to the ones described previously, can be used in conjunction with the EL wide-rocker switch 90. Varied and interesting effects can be attained especially if the EL panels 14A and 14B are a different color than the EL panels used in the EL wall plate.

Referring again to FIGS. 1 and 2, the electroluminescent panel 14 can be lit continuously (i.e., twenty-four hours a day). An electroluminescent lamp covering the entire wall plate 10 draws approximately 1.5 watts per day. However, in the preferred embodiment, the subject wall plate is provided with a means to deactivate the EL panel 14 during the day or in response to high levels of ambient light. As shown in FIGS. 1 through 5, a light-sensitive switch 20 (e.g., a photodiode, phototransistor or photoconductive cell) can be mounted on the wall plate 10. The photoconductive cell 20 may be located at any desired spot on the EL lamp 14.

The photoconductive cell 20 has a pre-set light intensity level. As the intensity of the ambient light in the room increases, the amount of light falling on photoconductive cell 20 increases. When the light falling on photoconductive cell 20 exceeds the pre-set level, the photoconductive cell 20 deactivates EL panel 14. When the intensity of the light falling on photoconductive cell 20 drops below the predetermined intensity level, the photoconductive cell 20 activates EL panel 14.

Figure 6:
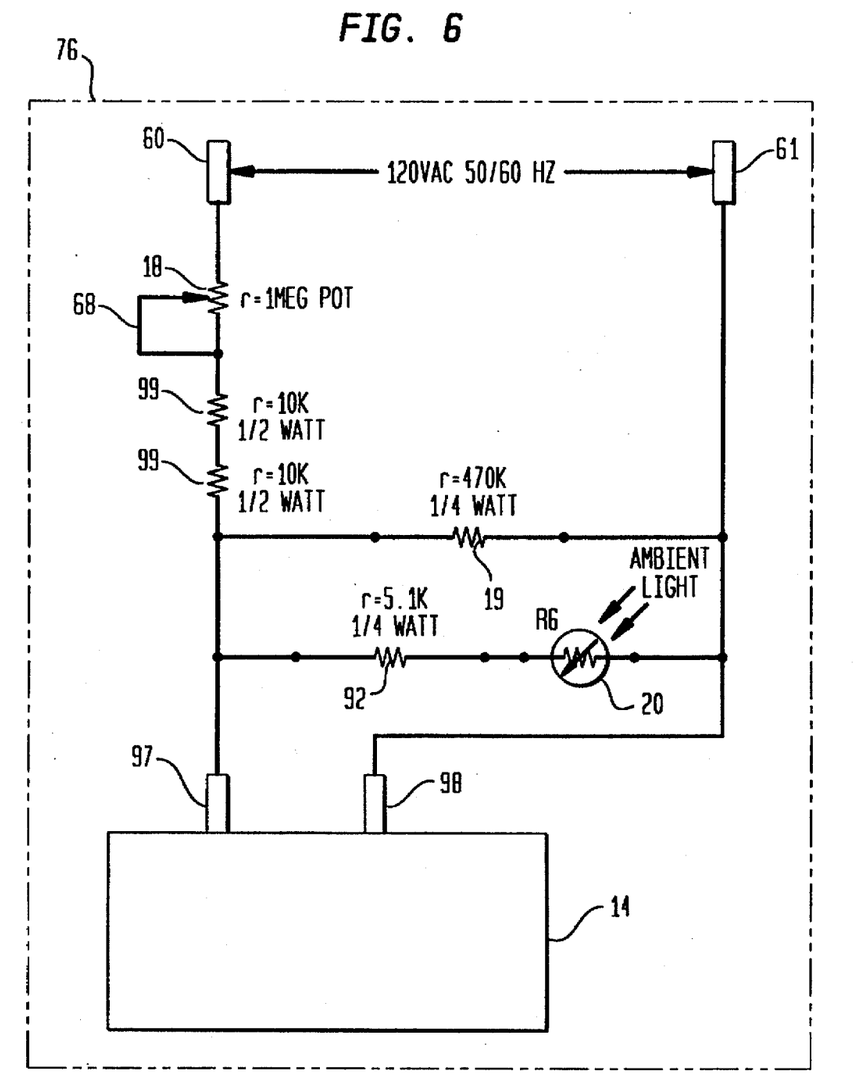
FIG. 6 is a schematic circuit diagram of a driver circuit for the electroluminescent lamp of the present invention.

A schematic diagram of the drive and control circuitry 76 is shown in FIG. 6. As one skilled in the art can appreciate, a variety of circuits may be designed to provide power and to control EL lamp 14.

Power is supplied to the drive circuitry 76 via wires 60, 61. A battery may provide the necessary power to operate the EL wall plate 10. However, in the preferred embodiment, power is supplied by connecting the wires 60, 61 of the control circuitry 76 to the AC power lines of the underlying device.

Figure 7:
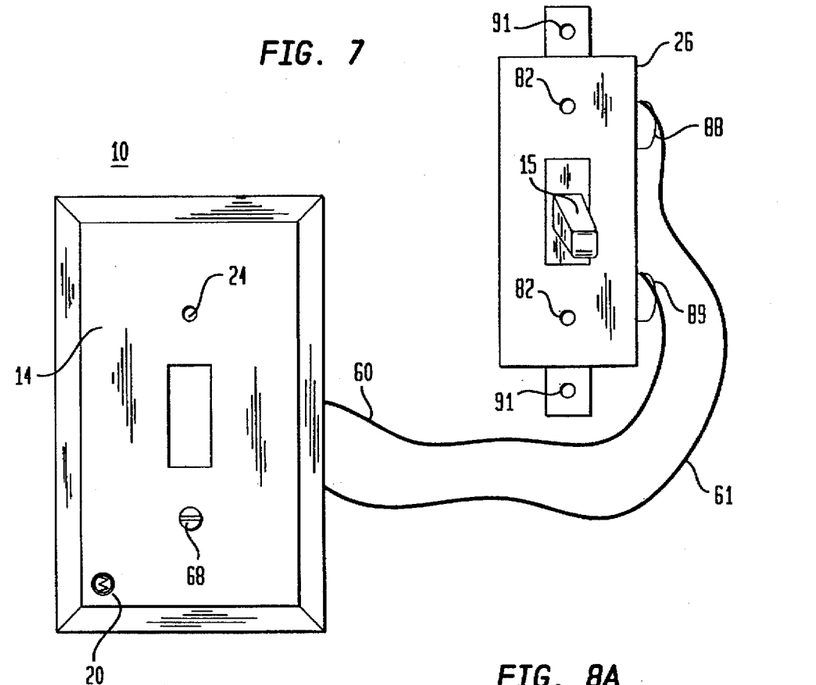
FIG. 7 is a front plan view of an EL switch plate according to the present invention in which the connection to the AC source is shown.

As shown in FIG. 7, the underlying device may be a switch 26. (Also, see FIG. 5.) Switch 26 may control, for example, a ceiling light in the room. Connecting wires (not shown) deliver the AC power to the switch 26 and the ceiling light. The connecting wires are electrically connected to the switch 26 via screw terminals 88, 89. As switch 26 opens and closes (i.e., by pivoting or moving throw 15) the electrical connection between terminal 88 and terminal 89 breaks and makes, respectively, which turns the ceiling light on and off.

Wire 60 is connected to the incoming or "hot" AC connecting wire via screw terminal 88. Similarly, wire 61 is connected to the outgoing AC connecting wire via screw terminal 89. In this manner, AC power is provided to the control circuitry 76.

Referring again to FIG. 3A, aperture 36 may be drilled through the back plate 12 to facilitate the passing of wires 60 and 61 to the terminals 88 and 89 of the underlying device. The drive circuitry 76 is preferably located behind the EL lamp 14 and may be sealed to the back side of the EL lamp 14. (see, for example, FIG. 8A.)

Referring again to FIG. 6, the opposite end of wire 60 is connected to a rheostat or variable resistor 18. One or more current limiting resistor(s) 99 are connected in series to the variable resistor 18.

Although only one EL panel is shown in FIG. 6, a plurality of EL panels may be connected in series with each other. The EL panel has two electrical connections which are used to electrically connect the EL panel 14 in parallel with the photoconductive cell 20. This EL panel/photoconductive cell parallel circuit has a first terminal connection 97 and a second terminal connection 98.

An optional current limiting resistor 92 may be placed in series with the photoconductive cell 20. In this embodiment, the current limiting resistor 92 is connected to the photoconductive cell 20 and to the first terminal 97.

The current limiting resistor 99 is connected to first terminal 97 of the parallel EL lamp/photoconductive cell circuit. The second terminal 98, is connected to the outgoing side of the switch 26, namely screw terminal 89, via wire 61 forming a closed electrical circuit.

A shadowing resistor 19 may be connected across terminal 97 and terminal 98, i.e., in parallel with the EL lamp and photoconductive cell. The shadowing resistor 19 reduces the sensitivity or reaction time of photoconductive cell 20, thereby decreasing the number of unwanted power fluctuations to the EL panel 14. The shadowing resistor is especially useful during high ambient light levels, i.e., when the photoconductive cell 20 is activated and the EL lamp is off. A temporary shadow which falls over the photoconductive cell 20 (e.g., caused by a person walking by the wall plate or if the sun goes behind a cloud) may deactivate the photoconductive cell 20 and activate the EL panel 14. The shadowing resistor 19 prevents the EL lamp 14 from flickering on and off when shadows fall on the photoconductive cell 20.

As mentioned previously, the instant wall plate may be placed anywhere in the house. Accordingly, it may be desirable to effectively turn the EL lamp completely off, adjust the light emitted by the EL lamp to a low glow (e.g., for use as a night light in a bedroom) or turn the EL lamp up to full brightness to serve as an area light.

The instant invention allows a person to adjust the brightness of the light emitted by EL panel 14 by turning adjusting stem 68 of variable resistor 18. When the variable resistor 18 is adjusted, the intensity of the light given off by the EL lamp 14 can be increased or decreased, without removing the wall plate 10 from the wall; if desired, the variable resistor can reduce the current to the EL panel to a level at which the EL panel emits no noticeable light.

Adjusting stem 68 of variable resistor 18 may be positioned almost anywhere on the wall plate 10. However, it is desirable to locate adjusting stem 68 on the front surface of the wall plate 10, which would allow easy access by the user. (See FIGS. 1 through 4.) The adjusting stem 68 can be made inconspicuous by designing it to look like one of the standard screws used to secure the wall plate as shown in FIGS. 1 through 3. (It should be noted that one securing screw 13 will adequately hold the wall plate 10 against the wall.)

A second variable resistor (not shown) may be connected in series with the photoconductive cell 20 to control the sensitivity of the photoconductive cell 20. The second variable resistor would allow a user to adjust the intensity level at which the photoconductive cell would respond to the ambient light, in turn controlling the ambient light level at which EL lamp 14 is activated and deactivated. This is a desirable feature since switch plates are located at various locations within the household (e.g., in the hallway, next to a lamp or window, etc.). Each location has a different ambient light level. Accordingly, a user can choose the optimum activation level for each installation. Alternatively, an off-the-shelf photoconductive cell having a built-in means for adjusting its sensitivity may be utilized.

The operation of the EL wall plate will now be described with reference to FIG. 6. If the intensity of ambient light in the room is higher than the pre-set level, the photoconductive cell 20 conducts electricity and current will flow through the adjustable resistor 18, the current limiting resistors 99, second current limiting resistor 92, and photoconductive cell 20, thereby deactivating the EL lamp 14. A small current also flows through the shadowing resistor 19, thereby reducing the sensitivity of the photoconductive cell to passing shadows.

When the intensity level of the ambient light drops below the predetermined level, the photoconductive cell 20 turns off, effectively forming an open circuit in that leg of the parallel circuit. Accordingly, the current flows through the variable resistor 18, the current limiting resistor 99 and the EL lamp 14, thereby activating the EL lamp 14. A small current again flows through the shadowing resistor 19, preventing the photoconductive cell from inadvertently conducting, which would deactivate EL lamp 14.

The variable resistor 18 regulates the current flowing through the drive circuit 76. Therefore, when the EL lamp 14 is activated, its brightness can be controlled by changing the resistance of variable resistor 18 by way of turning adjusting stem 68.

The subject light emitting wall plate with its photoactivated switch 20 and luminance adjustment 18 provides a convenient and efficient means of locating a light switch and/or illuminating a room or hallway when there is a low ambient light level. This light emitting wall plate is easy to mount on a wall, works with any standard electrical switch or outlet, can be deactivated in a timely manner, has low manufacturing costs, a long lamp life, and will work in rooms or hallways having any ambient light level.

Figure 8A:
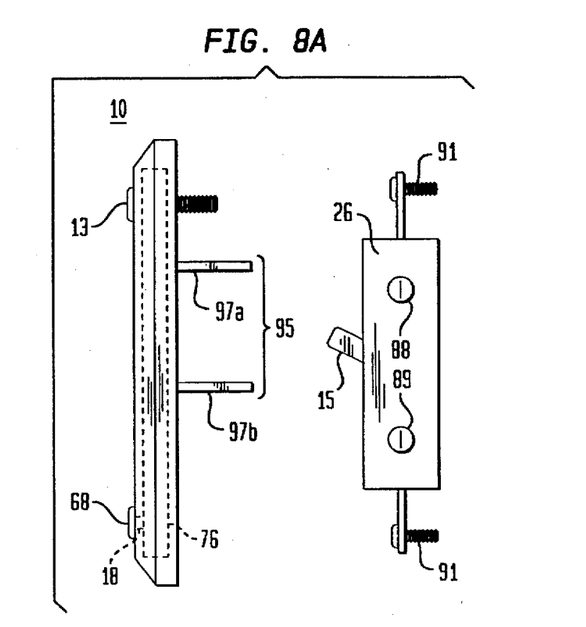
FIG. 8A is a side elevational view of an EL switch plate according to the present invention showing the clip means.
Figure 8B:
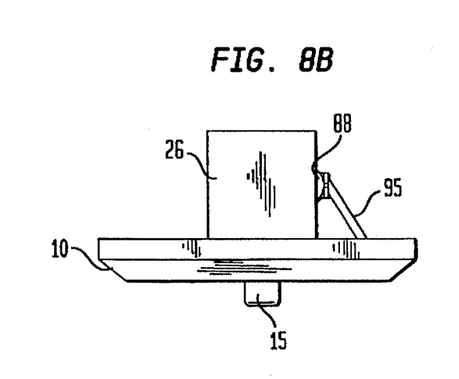
FIG. 8B is a top plan view of an EL switch plate according to the present invention mounted over a switch showing the clip means of FIG. 8A.

Mounting the present invention does not require special tools or modification to the existing switch, electrical box or wall. The drive circuitry 76 can be connected directly to the terminals 88 and 89 of the underlying switch or receptacle via wires 60, 61 as shown in FIG. 7. Alternatively, a means for connecting the EL wall plate 10 to the existing switch without having to remove the light switch from its electrical box is shown in FIGS. 8A and 8B. The EL wall plate is equipped with spring tensioned metallic clip means 95 which are designed to make electrical contact with the switch's AC screw terminals 88, 89. (The screw terminals 88, 89 are used to secure the incoming and outgoing AC "hot" wires to the switch 26.)

The clip means 95 is attached to the back side of the housing as shown in FIG. 8A. The clip means 95 includes two elongate members, 97A, 97B, each having a first end attached proximate the housing and a second end extending therefrom. The approximate length of each elongate member is such that the second ends 97A, 97B contact the terminals 88, 89, respectively, when the switch plate 10A is affixed over the switch 26.

In one embodiment, the elongate members 97A, 97B may be manufactured from an electrically conductive metal. The elongate members 97A, 97B are spring tensioned. This will ensure that the first ends of each elongate member remain in contact with the terminals 88, 89 of switch 26.

Elongate member 97A must be electrically isolated from the elongate member 97B to prevent a short circuit. The first ends of the elongate members may be attached directly to the EL panel 14. The wall plate is secured to the switch or receptacle by tightening securing screw 13 into aperture 82, in the normal manner. Minimal wiring and installation time is needed. It should be noted that sundry embodiments could be devised which allow the wall plate to be clipped to the switch, thereby eliminating the need for securing screws altogether.

Even though particular embodiments of the present invention have been illustrated and described herein, this is not intended to limit the invention. It is therefore to be understood that modification and variation of the embodiments described above may be made without departing from the spirit or scope of the invention.

I claim:

1. A wall plate for covering a standard electrical apparatus positioned in a wall, the electrical apparatus having terminals for connecting to electrical conductors that are external to the wall plate and electrical apparatus, the standard electrical apparatus further having a threaded aperture for accepting a securing screw, the wall plate comprising:

an independent support means for providing structural support to the wall plate, the independent support means conforming substantially to the dimensions of a standard wall plate and including a substantially planar back surface, and the support means having an aperture disposed for alignment with the threaded aperture of the standard electrical apparatus for securing the support means to the standard electrical apparatus with the securing screw;

an electroluminescent panel located proximate the support means such that the support means and the electroluminescent panel have the profile substantially of a standard wall plate; and clip means having multiple spring-tensioned elongated members attached to the substantially planar back surface of said support means, said clip means providing an electrical connection between the electroluminescent panel and the terminals of the electrical apparatus for providing power to the electroluminescent panel.

2. The wall plate of claim 1, further comprising a light-activated means electrically connected to the power signal introducing means and the electroluminescent panel for controlling the energy to the electroluminescent panel in response to ambient light.

3. The wall plate of claim 2, wherein the light-activated means is a photoconductive cell.

4. The wall plate of claim 2, further comprising a means for adjusting the sensitivity of the light-activated means to ambient light, thereby controlling the activation of the electroluminescent panel in response to ambient light levels.

5. The wall plate of claim 1, further comprising a regulating means electrically connected to the power introducing means and the electroluminescent panel for adjusting the intensity of the illumination produced by the electroluminescent panel.

6. The wall plate of claim 5, wherein the regulating means is a variable resistor.

7. The wall plate of claim 1, wherein the support means is a rigid and substantially transparent cover positioned over a front face of the electroluminescent panel for protecting the electroluminescent panel.

8. The wall plate of claim 1, wherein the support means is a backplate sealed to the back surface of the electroluminescent panel.

9. The wall plate of claim 1, wherein the wall plate is of the type used to cover a switch, the switch being recessed into a wall and having a throw extending beyond the plane of the wall, wherein the wall plate has an aperture which allows the throw to pass through the wall plate and permits free movement of the throw.

10. The wall plate of claim 9, wherein the power introducing means is connected to AC power terminals of the switch.

11. The wall plate of claim 1, wherein the wall plate is of the type used to cover a receptacle, the face of the receptacle extending beyond the plane of the wall unit, wherein the wall plate includes an aperture to accomodate the face of the receptacle.

12. The wall plate of claim 11, wherein the power means is connected to AC terminals of the receptacle.

13. The wall plate of claim 1 wherein the electroluminescent panel is approximately the size of the wall plate, said electroluminescent panel having an aperture that coincides with said aperture of the support means.

14. The wall plate of claim 1 wherein the clip means comprises two elongate members extending from the back side of the support means.

15. The wall plate of claim 14 wherein the elongate members are spring tensioned.

16. An improved switch plate of the type used to cover a standard switch recessed inside a wall unit, the switch having terminals for connection with a power source and having a throw which controls the flow of power to an external device, the throw extending through the switch plate, the standard switch having a threaded aperture for accepting a securing screw that secures the switch plate to the switch, the improvement comprising:

an electroluminescent panel attached to the front face of a back plate, said back plate providing structural support and conforming substantially to the dimensions of a standard switch plate; and clip means having a plurality of spring-tensioned elongated members attached to the substantially planar rear side of said back plate, said clip means providing an electrical connection between the electroluminescent panel and the terminals.

17. The switch plate of claim 16, further comprising a substantially non-opaque cover mounted to the front face of the electroluminescent panel which allows the light emitted by the electroluminescent panel to pass therethrough, the non-opaque cover provides additional structural support to the electroluminescent panel and protects the front of the electroluminescent panel.

18. The switch plate of claim 16, further comprising a light-activated means connected between the power supplying means and the electroluminescent panel for controlling the energy to the electroluminescent panel depending on ambient light levels.

19. The wall plate of claim 16, further comprising a regulating means electrically connected to the power supplying means and the electroluminescent panel for adjusting the intensity of the illumination produced by the electroluminescent panel.

20. The improved switch plate of claim 16 wherein said electroluminescent panel covers substantially the entire front face of the standard switch plate, said electroluminescent panel having an aperture disposed therethrough in alignment with the threaded aperture of the switch.

21. The improved switch plate of claim 16 wherein the clip means comprises two elongate members extending from the back of the switch plate.

22. The improved switch plate of claim 21 wherein the elongate members are spring tensioned.

* * * * *